July 6, 1937.  E. T. LARK  2,086,332
RECEPTACLE AND DISPENSING APPARATUS
Filed June 5, 1935   3 Sheets-Sheet 1

INVENTOR:
Everard T. Lark,
BY
Hugh K. Wagner
ATTORNEY.

July 6, 1937.  E. T. LARK  2,086,332
RECEPTACLE AND DISPENSING APPARATUS
Filed June 5, 1935  3 Sheets-Sheet 2

INVENTOR
Everard T. Lark,
BY
Hugh K. Wagner
ATTORNEY.

July 6, 1937.                E. T. LARK                2,086,332
RECEPTACLE AND DISPENSING APPARATUS
Filed June 5, 1935          3 Sheets-Sheet 3

INVENTOR:
Everard T. Lark
BY
Hugh K. Wagner
ATTORNEY.

Patented July 6, 1937

2,086,332

UNITED STATES PATENT OFFICE 2,086,332

RECEPTACLE AND DISPENSING APPARATUS

Everard T. Lark, Columbia, Ill.

Application June 5, 1935, Serial No. 25,085

10 Claims. (Cl. 226—93)

This invention is especially intended as a convenience for physicians practicing proctology, but is adapted for the use of other kinds of doctors and surgeons and for many other useful purposes.

In the practice of proctology, a large amount of ointment is used, and, for this purpose, a main reservoir of the same is provided and means for withdrawing the same in a cleanly manner by mechanical means and without the fingers of the operator coming in contact with the ointment. This is desirable for aseptic reasons, as well as to avoid the messiness arising from physical contact of the operator with the contents of the said reservoir.

In order that the operator may have available a plurality of filled or partially filled tubes of ointment or other substance and access to more in the said reservoir, a holder for such tubes is associated with the said reservoir and means for extracting its contents in such a manner as to be handy and to constitute the whole as a single piece of apparatus.

As other medicaments or other substances are likely to be needed by the person using the contents of the main reservoir, a group of holders for bottles or other containers of such other medicaments or substances is located around the above-mentioned tube-holder.

The whole constitutes a compact, efficient, and utilitarian apparatus for holding and dispensing a main substance and adjuvants or accessories.

The size and capacity of the main reservoir will be determined by the quantity best suited to the probable convenience or necessities of the user. The size and construction of tube-holder may be changed. The holders for the containers of adjuvants and accessories may, also, be varied.

The device, as a whole, is preferably formed of non-corrosive material.

In the accompanying drawings, in which like numbers of reference refer to like parts wherever they occur, Figure 1 is a front elevation;

Figure 13 is a top plan view of a device for attaching the main device in a fixed or stationary manner to a table or the like;

Figure 1:
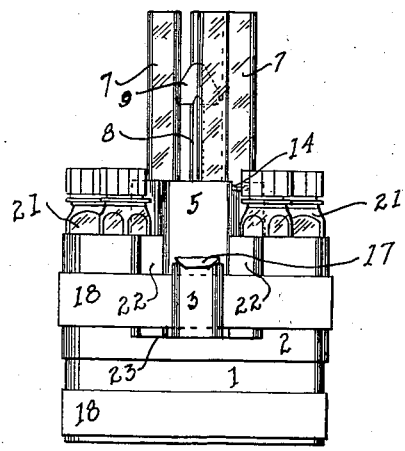
Figure 2:
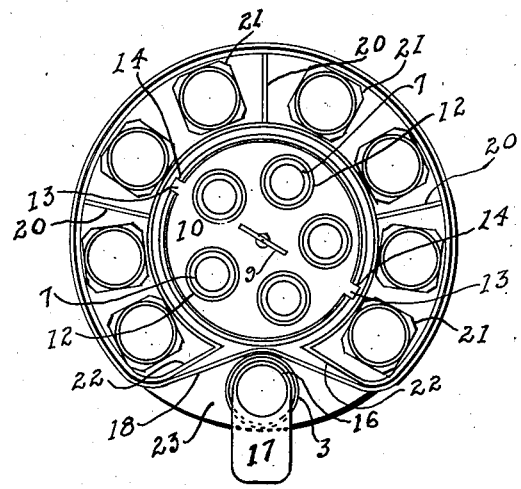
Figure 2 is a top plan view.
Figure 3:
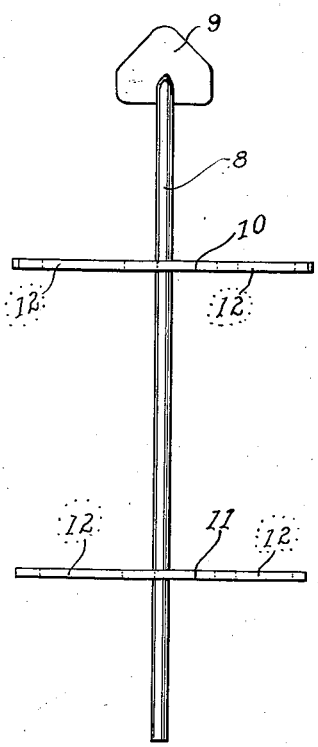
Figure 3 is an elevation of a support or holder in the form of a rack.
Figure 4:
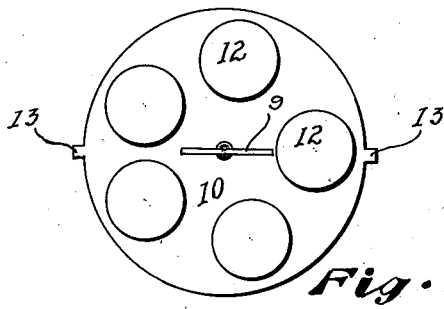
Figure 4 is a top plan view thereof.
Figure 5:
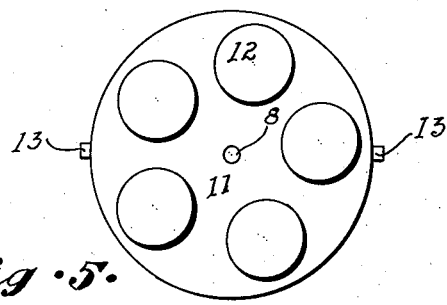
Figure 5 is a bottom plan view thereof.
Figure 6:
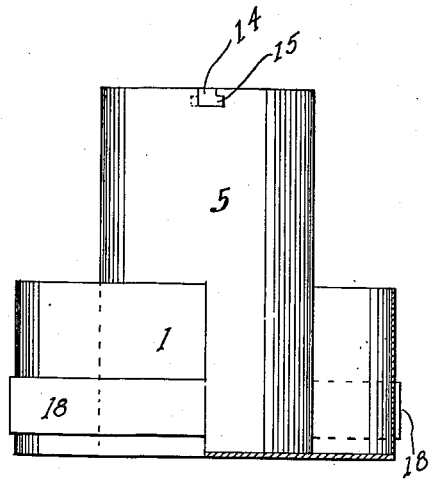
Figure 6 is a side elevation of the main cylinder forming the reservoir, showing the holder cylinder projecting upwardly from its floor and part of its side wall being broken away, so as to show the inside of the said reservoir and the manner in which the said holder cylinder projects upwardly from the center of the base floor of a said reservoir cylinder.
Figure 7:
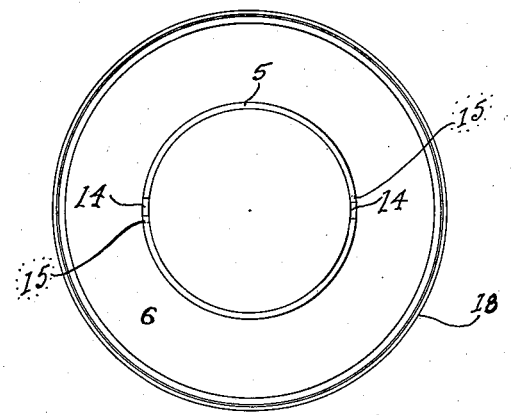
Figure 7 is a top plan view of the same, but without breaking away any part of the wall of the outer cylinder.
Figure 8:
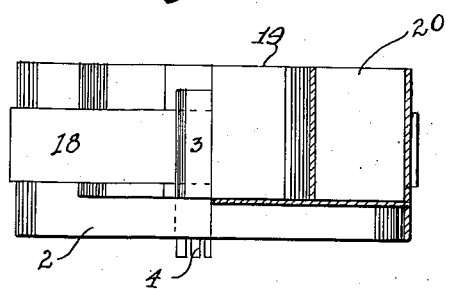
Figure 8 is a front elevational view of the cap-member that telescopes the outer cylinder shown in Figure 6 and through which the inner cylinder of Figure 6 passes, showing, also, the outlet from the above-mentioned reservoir and the resilient fingers at the inner end of the said outlet, part of the cap-member being broken away.
Figure 9:
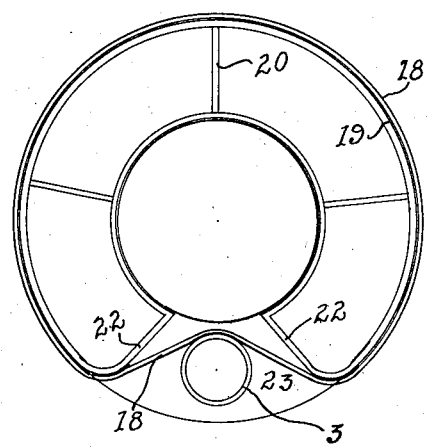
Figure 9 is a top plan view of the cap-member shown in Figure 6.
Figures 10, 11:
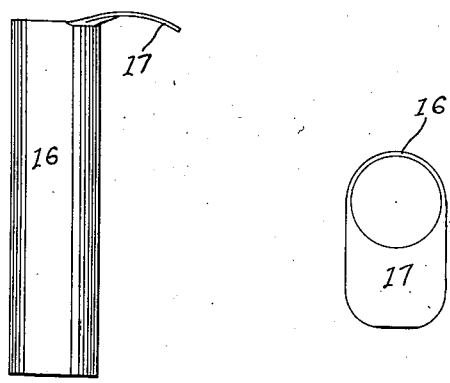
Figure 10 is a side elevation of the means for expressing the contents of the said reservoir.
Figure 11 is a bottom plan view of the said expresser.

This invention consists essentially in the provision of a reservoir and means for extraction of its contents without manual contact therewith and adjacent receptacles for receiving the said contents.

In the preferred embodiment of this invention, the cylinder 1 is intended to serve as the said reservoir, the cylinder 2 acts as a closure or cap therefor, and a tubular outlet 3 is carried by the cylinder or cap 2. The outlet 3 is securely attached to cap 2. The inner end of the outlet 3 is preferably made resilient, as illustrated by the spring-fingers 4. The central cylinder 5, concentric with cylinder 1, projects upwardly from the base or floor 6 of cylinder 1. The cylinder or holder 5 is hollow for the reception of a plurality of non-corrodible tubes 7, preferably made of glass or the like.

Preferably, a rack 8 will be located in the holder 5, in order to keep the tubes 7 from rattling or breaking. This rack will preferably be topped with a finger-piece 9, and will preferably support two shelves 10 and 11 fixed thereto. A plurality of holes 12 is provided in the shelves 10 and 11, to serve as guides for tubes 7. Lugs 13 on rack 8 fit into notches 14 in the upper rim of holder 5 and are adapted to lock therein by reason of the undercuts 15, one of which is provided in each notch 14.

Figure 12:
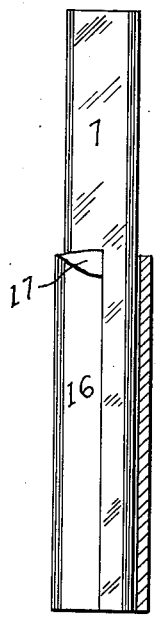
Figure 12 shows a receiving tube in the expresser in position to be filled.

A tubular member 16 is provided with a fingerhold 17, by which it is slidable longitudinally in the tubular outlet 3. When it is desired to fill one or more of the tubular receivers 7 with the contents of the reservoir within cylinder 1, such a tube 7 is inserted in the slidable member 16 and the same is depressed by the holder 17, which causes the member 16 to press down into the ointment or other substance in the reservoir in cylinder 1, which has the effect of forcing the same upwardly through the hollow member 16 into the tube 7, without contact of the finger or any other part of the body of the operator with the ointment or the like. On account of the length of the tube 7, as indicated in Figures 1 and 12, the same extends materially above the top of the tubular outlet 3 at the time when the slidable member 16 is depressed to the lowest limit of its travel within the reservoir. Thus, the upper end of each tube 7 constitutes a clean handle by which the tube may be lifted. In fact, the ointment or other substance expressed from the reservoir comes in contact with no part of the outer surface of the tube 7. The tube 7, when thus charged, may either be used immediately upon a patient or may be put in the rack 8 for use when needed. Preferably, a plurality of charged tubes 7 will be kept at all times in the rack 8 and holder 5, but, as their contents may be used up before the treatment or operation is over, the filling apparatus needs to be close at hand. Bands 18 made of rubber, felt, or other suitable material are preferably placed around the cylinders 1 and 2, in order to facilitate rotation of the members 1 and 2 with relation to each other, for the following purposes.

When a tube 7 is filled from cylinder 1, a hole or cavity is formed in the material located within cylinder 1. In order for the next tube to be filled or the same tube to be filled to a higher level, it is necessary to rotate cylinder 1 a short distance, so that the plunger or slidable member 16, otherwise herein denominated the expresser, will dip into a quantity of material instead of the said hole or cavity in the cylinder 1 when the next tube is to be filled. For this reason, the two cylinders are held with fingers upon bands 18 and slightly rotated with relation to each other. When complete rotation has taken place and the expresser 16 has sucked a hole at each station in the said complete rotation, the expresser 16 can again be pushed all the way down in outlet 3, which causes the bottom or inner end of expresser 16 to touch the floor or base 6 of cylinder or reservoir 1, and, upon rotation, as previously described, of the cylinders 1 and 2 with relation to each other, the said expresser acts as a scraper in the channel or groove between the wall of cylinder or holder 5 and the wall of the main cylinder 1. This scraping effect will have the result of moving or compacting a sufficient body of the material within the channel or groove constituting the reservoir to provide a supply of material in which the inner end of the expresser can again embed itself as when the reservoir was originally full.

The resilient fingers or other elastic member 4, at the inner end of the outlet 3, serve as wipers or scrapers to clean surplus material from the outside of expresser 16 when it is desired to withdraw the same from its normal seat in hollow outlet 3.

Above the top of the cap or cylinder 2, projects a flange 19, which, with partitions 20, form a receptacle for additional medicines, adjuvants, or accessories, which may be kept in the rack thereby constructed in bottles 21. It will be observed that the said flange is doubled and provided with ends 22, whereby the contents of the rack formed by it does not interfere with the rotation of cylinders 1 and 2 with relation to each other. The configuration of the said rack is such as to leave a bay 23, in which the outlet 3 is located, thus additionally tending to the compactness of the apparatus as a whole.

Some occasions may arise when the practitioner will have only one hand free to rotate the cap or cylinder 2 with relation to the reservoir cylinder 1, and in such circumstances it will be desirable for the cylinder 1 to be stationary on the instrument table or some similar support. To provide a ready and convenient means of such attachment, a split elastic ring 24, having braces or cross-pieces 25 and a plurality of vacuum cups 26, serves as a combined seat or rest or support for the cylinder 1 and a means for holding the same and, also, a means for attachment of the same to a table or other suitable place. The cylinder 1 seats or rests upon the cross-pieces 25, the bolt 27 and nut 28 tightly clamp the ring 24 around cylinder 1, and the vacuum cups 26 by their suction attach the cylinder 1 to the table or the like.

Figure 13:
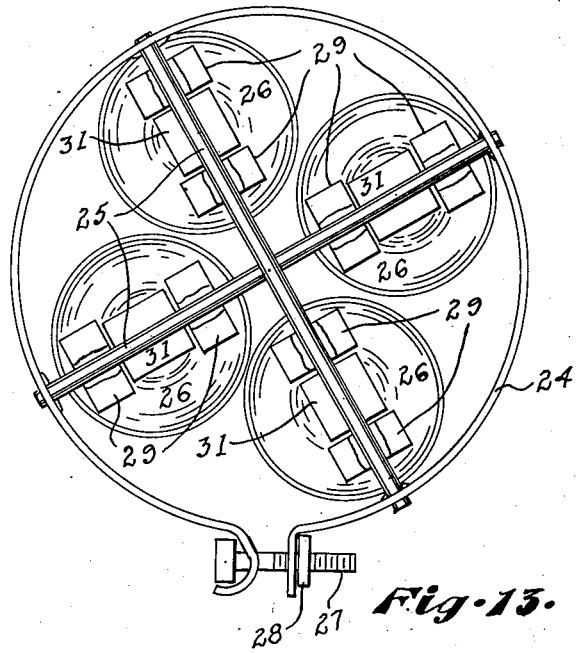
Figure 14:
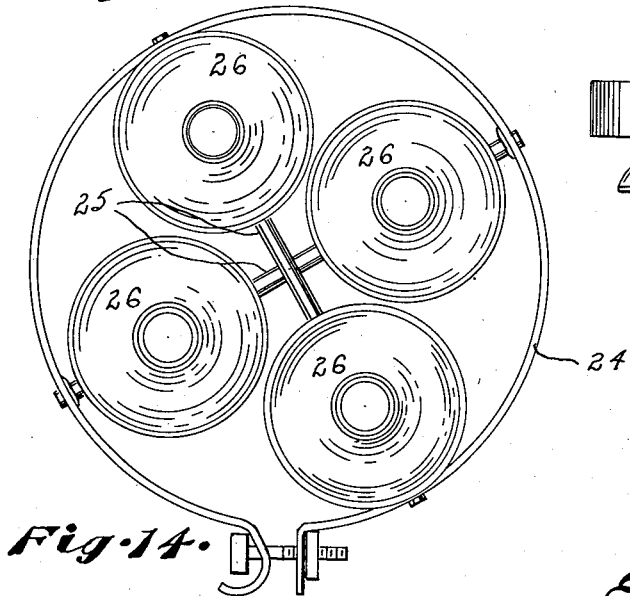
Figure 14 is a bottom plan view of the same.
Figure 15:
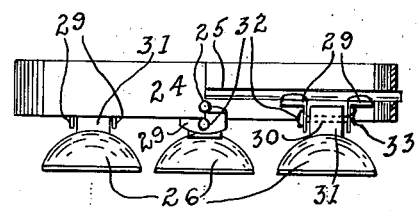
Figure 15 is a side elevation thereof, on a smaller scale, partly in section.

The cups 26 may be attached in any suitable manner to the frame or braces 25 or other support-member for cylinder 1, but in the drawings (Figures 13 and 15) are shown fastened thereto by angle-members 29 and split pins 30, which latter pass through holes in the angle-members and through the studs 31 on the cups. Each pin 30 has a head 32, and its other end 33 is upset. One cup 26 centrally located may take the place of the plurality of such cups shown in the drawings.

It will be understood that, when the apparatus is fixed to a table or the like, as just described, the expression herein used of rotation of the pair of cylinders 1 and 2 with relation to each other means rotation of cylinder 2 with relation to the fixed cylinder 1.

It is obvious that many minor changes may be made in the form, order, and arrangement of the various parts without departing from the spirit of this invention or the scope of the following claims.

I claim:

1. A combined receptacle and dispenser, consisting of a pair of hollow cylinders, one being larger than the other and adapted to cap the same, a tubular outlet from the inside of the said hollow cylinders borne by the capping member, a hollow member slidable in the said outlet, and means for holding a plurality of receiving elements adapted to fit in the said hollow member and to receive the contents of one of the said hollow cylinders.

2. A combined receptacle and dispenser, consisting of a pair of hollow cylinders, one being larger than the other and adapted to cap the same, a tubular outlet from the inside of the said hollow cylinders borne by the capping member, and a hollow member slidable in the said outlet, the said outlet having a resilient inner end.

3. A combined receptacle and dispenser, comprising a pair of coacting hollow cylinders, one of the same telescoping the other and forming a cap therefor, a central hollow cylinder projecting from the floor of one of the said cylinders and forming a shaft on which the said cap member is adapted to slide and to rotate, an outlet from the inside of the said pair of cylinders, a member slidable within the said outlet and adapted to act as a scraper within the said pair of cylinders when the same are rotated with relation to each other.

4. A combined receptacle and dispenser, comprising a pair of coacting hollow cylinders, one of the same telescoping the other and forming a cap therefor, a central hollow cylinder projecting from the floor of one of the said cylinders and forming a shaft on which the said cap member is adapted to slide and to rotate, an outlet from the inside of the said pair of cylinders, a member slidable within the said outlet and adapted to act as a scraper within the said pair of cylinders when the same are rotated with relation to each other, and a rack located within said central cylinder forming a shaft and adapted to hold receivers containing portions of the contents removed from said pair of cylinders.

5. A combined receptacle and dispenser, comprising a main reservoir having a hollow cylinder rising from its floor, a cap closely fitting the said cylinder, a rack for receivers for the contents removed from the said reservoir located in the said hollow cylinder, an outlet from the said reservoir, a hollow member adapted to slide in the said outlet and to express the contents of the said reservoir into the said receivers.

6. A combined receptacle and dispenser, comprising a main reservoir having a hollow cylinder rising from its floor, a cap closely fitting the said cylinder, a rack for receivers for the contents removed from the said reservoir located in the said hollow cylinder, an outlet from the said reservoir, a hollow member adapted to slide in the said outlet and to express the contents of the said reservoir into the said receivers and to act as a scraper within the said reservoir when the said cap and reservoir are rotated with relation to each other.

7. A combined receptacle and dispenser, comprising a main reservoir, having a hollow cylinder rising from its floor, a cap closely fitting the said cylinder, an outlet from the said reservoir, a hollow member adapted to slide in the said outlet and to express the contents of the said reservoir into the said receivers and to act as a scraper within the said reservoir when the said cap and reservoir are rotated with relation to each other, there being a rack within the said hollow cylinder adapted to hold receivers for portions of the contents removed from said reservoir, there being a notch in the outer edge of the said hollow cylinder adapted to receive a part of the said rack.

8. A combined receptacle and dispenser, comprising a holder for a receiving tube, a reservoir with which the said holder is connected, a cap for the said reservoir in contact with the said holder, an outlet from the said reservoir borne by the said cap, and a hollow expresser adapted to slide in the said outlet and communicate with the said reservoir and receive the said receiving tube.

9. A combined receptacle and dispenser, comprising a cylinder, means for holding the same, a vacuum cup attached to the said holding means, and adapted to hold the said first-mentioned cylinder stationary, a coacting cylinder adapted to be rotated with relation to the said first-mentioned cylinder, a holder for a receiving tube and connected with the said first-mentioned cylinder, which first-mentioned cylinder constitutes a reservoir and the said second-mentioned cylinder a cap therefor, an outlet from the said reservoir borne by the said cap, and a hollow expresser adapted to slide in the said outlet and communicate with the said reservoir and to receive the said receiving tube.

10. A combined receptacle and dispenser, comprising a cylinder, means for holding the same, a vacuum cup attached to the said holding means, and adapted to hold the said first-mentioned cylinder stationary, a coacting cylinder adapted to be rotated with relation to the said first-mentioned cylinder, a holder for a receiving tube and connected with the said first-mentioned cylinder, which first-mentioned cylinder constitutes a reservoir and the said second-mentioned cylinder a cap therefor, an outlet from the said reservoir borne by the said cap, and a hollow expresser adapted to slide in the said outlet and communicate with the said reservoir and to receive the said receiving tube, the said means for holding the said first-mentioned cylinder being composed of a clamping ring and means for drawing and holding the same tightly around the said cylinder and, also, bearing means for fastening the said vacuum cup thereto.

EVERARD T. LARK.